United States Patent
Bakshi

(10) Patent No.: US 7,313,394 B2
(45) Date of Patent: Dec. 25, 2007

(54) SECURE PROXY MOBILE APPARATUS, SYSTEMS, AND METHODS

(75) Inventor: Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/182,498

(22) Filed: Jul. 15, 2005

(65) Prior Publication Data

US 2007/0016774 A1    Jan. 18, 2007

(51) Int. Cl.
*H04Q 7/20* (2006.01)

(52) U.S. Cl. .............................. 455/432.1; 455/435.1; 455/436; 455/439; 455/442; 455/422.1; 380/247; 380/250

(58) Field of Classification Search ............... 455/455, 455/422.1, 456.1, 456.2, 456.3, 456.4, 432.1, 455/435.1, 436, 439, 442; 380/247–250
See application file for complete search history.

(56) References Cited

U.S. PATENT DOCUMENTS

| | | | |
|---|---|---|---|
| 6,742,036 B1 * | 5/2004 | Das et al. | 709/226 |
| 7,042,864 B1 * | 5/2006 | Leung et al. | 370/338 |
| 7,236,477 B2 * | 6/2007 | Emeott et al. | 370/331 |
| 2002/0114469 A1 * | 8/2002 | Faccin et al. | 380/270 |
| 2002/0193110 A1 | 12/2002 | Julka et al. | |
| 2004/0242233 A1 * | 12/2004 | Lutgen | 455/445 |
| 2005/0128990 A1 | 6/2005 | Eom et al. | |
| 2005/0213555 A1 | 9/2005 | Eyuboglu et al. | |
| 2005/0282562 A1 | 12/2005 | Lee et al. | |
| 2006/0019708 A1 * | 1/2006 | Raman et al. | 455/561 |
| 2006/0104234 A1 * | 5/2006 | Zhang | 370/328 |
| 2007/0005972 A1 * | 1/2007 | Mizikovsky et al. | 713/171 |
| 2007/0042776 A1 | 2/2007 | Bakshi et al. | |
| 2007/0086395 A1 | 4/2007 | Bakshi et al. | |
| 2007/0104179 A1 | 5/2007 | Srinivasan et al. | |

FOREIGN PATENT DOCUMENTS

| | | |
|---|---|---|
| EP | 1484863 A1 | 12/2004 |
| WO | WO-2004064434 A2 | 7/2004 |
| WO | WO-2005120178 A2 | 12/2005 |
| WO | WO-2005120181 A2 | 12/2005 |
| WO | WO-2007011995 A1 | 1/2007 |
| WO | WO-2007011995 B1 | 3/2007 |
| WO | WO-2007024436 A1 | 3/2007 |
| WO | WO-2007044990 A2 | 4/2007 |
| WO | WO-2007048056 A1 | 4/2007 |

OTHER PUBLICATIONS

P.Calhoun (Nokia Research Center) Authentication, Authorization, and Accounting (AAA) Registration Keys for mobile IPv4,□□Mar. 2005.*

(Continued)

*Primary Examiner*—Rafael Perez-Gutierrez
*Assistant Examiner*—Khai Nguyen
(74) *Attorney, Agent, or Firm*—Schwegman, Lundberg & Woessner, P.A.

(57) ABSTRACT

Secure proxy mobile apparatus, systems, methods, and articles are described generally herein. Other embodiments may be described and claimed.

19 Claims, 4 Drawing Sheets

OTHER PUBLICATIONS

"Mobile IP", http://www,cisco.com/univercd/cc/td/doc/product/software/ios120/120newft/120t/120t1/mobileip.htm, Cisco,(Oct. 3, 2003), 1-56.

Bakshi, S., et al., "Wireless Packet-Switched Paging Apparatus, Systems, and Methods", U.S. Appl. No. 11/208,427, filed Aug. 19, 2005.

Bakshi, S., et al., "Wreless Paging Apparatus, Systems and Methods", U.S. Appl. No. 11/251,066, filed Oct. 14, 2005.

Pareek, S., et al., "Techniques to Manage Paging Operations for Idle Mode Mobile Stations", U.S. Appl. No. 11/252,297, filed Oct. 17, 2005.

Perkins, C , et al., "Authentication, Authorization, and Accounting (AAA)—Registration Keys for Mobile IPv4—Request for Comments: 3957", http://www.faqs.org/ftp/rfc/pdf/rfc3957.txt.pdf, (Mar. 2005), 27 pgs.

Perkins, C., "IP Mobility Support for IPv4—Request for Comments: 3344", http://rfc-3344.rfc-index.com/, (Aug. 2002), 99 pgs.

Aboba, B., et al., "Extensible Authentication Protocol (EAP) Key Management Framework", *Standard-Working-Draft, Internet Engineering Task Force, IETF*, (Nov. 14, 2004).

Nakhjiri M, V. N., "EAP based Proxy Mobile IP key bootstrapping for WiMAX", *Standard-Working-Draft,Internet Engineering Task Force, IETF*, (Jan. 2005).

"Sleep-Mode Wireless Cell Reselection Apparatus, Systems, and Methods", U.S. Appl. No. 11/551,421, filed Oct. 20, 2006.

"Draft IEEE Standard for Local and Metropolitan Area Networks Part 16: Air Interface for Fixed and Mobile Broadband Wireless Access Systems Amendment for Physical and Medium Access Control Layers for Combined Fixed and Mobile Operation in Licensed Bands", *IEEE 802.16 Working Group on Broadban Wireless Acess*, Draft IEEE Standard for Local and Metropolitan Area Networks,,(Oct. 14, 2005),1-684.

Chung, Y. W., et al., "Performance Analysis of IP Paging and Power Saving Mode in IP-Based Mobile Networks", *15th IEEE International Symposium on Barcelona*, 3., (Sep. 5, 2004), 1533-1537.

Pack, S., et al., "Performance Analysis of IP Paging Protocol in IEEE 802.11 Networks", *Proceedings of the 28th Annual IEEE International Conference on Local Computer Networks*, (Oct. 20, 2003),673-680.

* cited by examiner

SECURE PROXY MOBILE APPARATUS, SYSTEMS, AND METHODS

TECHNICAL FIELD

Various embodiments described herein relate to digital communications generally, including apparatus, systems, and methods used to securely register a roaming mobile node with a home network.

BACKGROUND INFORMATION

A wireless device ("mobile node") may be capable of data network connectivity using Internet protocol (IP) datagrams. Some networks may utilize mobile-IP structures including those described in Internet Engineering Task Force (IETF) Request for Comments (RFC) 3344 "IP Mobility Support for IPv4" (August 2002) and related RFCs. These structures may include protocol enhancements designed to simplify network configuration and enhance security for a mobile node while roaming between networks. The mobile node may maintain a network address associated with a home network even while connected to a visited network. A roaming mobile node may register a "care-of" address with the home network to be used to forward data traffic to the roaming mobile node while connected to the visited network. The data traffic may be tunneled between the home network and the visited network to provide a path while the mobile node roams. Other security features may include authentication mechanisms to establish trust between the mobile node and the visited network, between the visited network and the home network, and between the mobile node and the home network.

A roaming mobile node may register directly with the home network using a mobile-IP networking stack on the mobile node. Alternatively, a proxy agent residing on a visited network node may contain the mobile-IP stack and perform the registration on behalf of the mobile node in a process referred to herein as "proxy mobile-IP." Proxy mobile-IP may be deployed within an enterprise access network (e.g., in the home network) wherein the access network and a registration agent in the enterprise network (the "proxy agent") belong to the same administrative domain or organization. The mobile node may roam between access points or base stations comprising nodes on the enterprise network. The mobile node may trust the enterprise access network in such situations. Mobile-IP registrations may thus be securely issued by a proxy agent on behalf of the mobile node in a context of this network architecture.

The security assumptions underlying proxy mobile-IP may be invalid, however, when the mobile node roams into foreign or "visited" access networks under the control of a different administrative domain than that of the home network. That is, the mobile node may not trust the visited access network to issue mobile-IP registrations on its behalf. Proxy mobile-IP signaling across administrative domains may expose unacceptable security relationships between the visited access network and a home agent in the mobile node's home network. Manually configuring security associations between domains with different security infrastructures may be problematic due to factors related to scalability and lack of predictability in a roaming environment.

DETAILED DESCRIPTION

Figure 1:
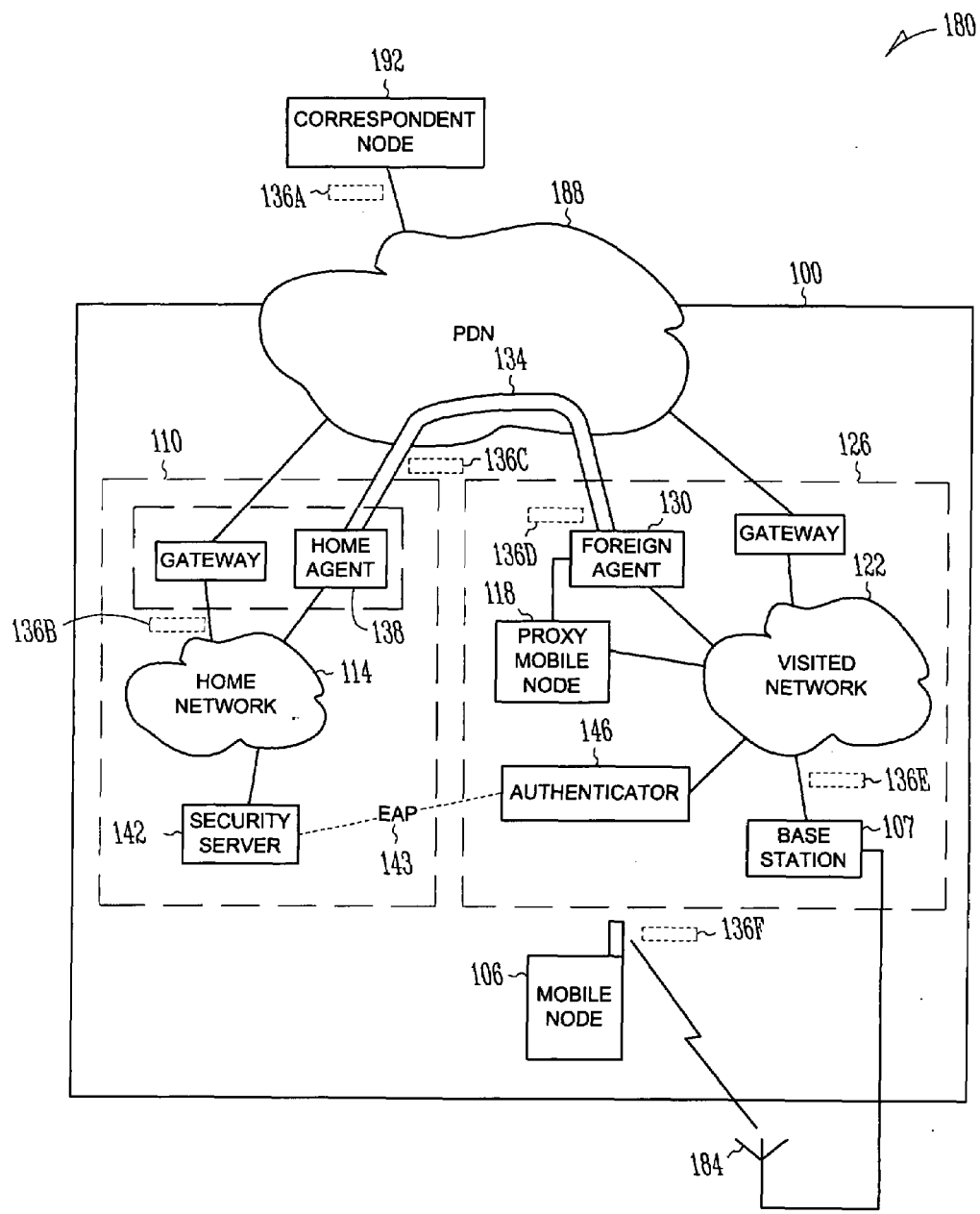
FIG. 1 is a block diagram of an apparatus and a representative system according to various embodiments of the invention.

FIG. 1 comprises a block diagram of an apparatus 100 and a system 180 according to various embodiments of the invention. Some embodiments may enable a proxy agent (hereinafter "proxy mobile node (PMN)") in a visited access network to securely issue mobile-IP (MIP) registrations on behalf of a roaming mobile node 106, wherein the mobile node 106 has no prior trust relationship with the visited access network.

Some embodiments may be capable of implementing proxy mobile-IP without changes to a back-end mobile-IP home agent infrastructure. Embodiments disclosed herein may utilize primary keying material generated as part of a mobile node security session, including perhaps an authentication, authorization, and accounting (AAA) security session. Secondary keying material may be generated from the primary (e.g., AAA) keying material for use by a proxy mobile-IP agent in the visited access network.

Some embodiments disclosed herein may thus leverage AAA infrastructure and associated trust relationships. The AAA infrastructure and relationships may be used by a proxy mobile node in the visited access network to authenticate and authorize network access for the mobile node 106. The proxy mobile node may then securely issue mobile-IP registrations on behalf of the roaming mobile node 106, even though the roaming mobile node 106 has no prior trust relationship with the visited access network.

An AAA authenticator may have a trust relationship with an AAA security server. The AAA server may have a trust relationship with a home agent. The mobile node may have a trust relationship with the home agent. These three trust relationships may be used to establish a trust between the proxy mobile node and the home agent if the AAA server authorizes the visited access network and the home agent to enable proxy mobile-IP service for the mobile node 106.

An AAA session, including perhaps an extensible authentication protocol (EAP) session, may be established when the mobile node 106 first enters the access network. The AAA server in the home network may populate a master session key (MSK) to the authenticator in the visited access network during the initial network entry authentication process. This key may be used to derive keying material for authorized services. Examples may include a session key for use between the mobile node 106 and a base station 107, and a PMN-AAA key. The keying material may also include a proxy mobile node-home agent (PMN-HA) key. The PMN-HA key may be used by the proxy mobile node to register a mobile-IP foreign agent with a home agent in a trusted manner. The foreign agent, located in the visited access network, may be registered on behalf of the mobile node. The AAA authenticator may trigger the proxy mobile node to send an initial registration request to the home agent in the home network. The registration may establish a bi-directional MIP tunnel between the home agent and the foreign agent to forward traffic to and from the mobile node 106. Additional information regarding a request-and-reply exchange mechanism used to establish an MN-HA key (PMN-HA key in the context of embodiments of the current invention) for a mobility binding session may be found in IETF RFC 3957 "AAA Registration Keys for Mobile IPv4" (March 2005).

The apparatus 100 may thus include the mobile node 106 as a participant in a first security domain 110 including a home network 114. The apparatus 100 may also include a proxy mobile node 118 located in a visited access network 122. The proxy mobile node 118 may couple to the mobile node 106 while the mobile node 106 roams in a second security domain 126. The second security domain 126 may include the visited network 122.

The proxy mobile node 118 may perform a secure and dynamic registration with the home network 114 on behalf of the mobile node 106. Both the secure registration and security architecture underlying the secure registration may operate dynamically. That is, the secure registration may occur without having entered identification data for the mobile node into a security database on the visited access network.

The apparatus 100 may also include a foreign agent 130 coupled to the proxy mobile node 118. The foreign agent 130 may comprise a receiving end of an Internet protocol tunnel 134 established to forward traffic (the traffic shown generally as 136A, 136B, 136C, 136D, 136E, and 136F) from the home network 110 to the mobile node 106. A home agent 138 may communicatively couple to the foreign agent 130 to forward the traffic.

The apparatus 100 may further include a security server 142 coupled to the home network 114 to authenticate the mobile node 106, perhaps via authentication operation 143 (e.g., EAP). The security server 142 may also generate cryptographic keys from which keying material for use in secure communications with the mobile node 106 can be generated. In some embodiments the security server may comprise an AAA server. An authenticator 146 may be coupled to the visited access network 122 to authenticate the mobile node 106 to the home network 114.

In another embodiment, a system 180 may include one or more of the apparatus 100, as previously described. The system 180 may also include an antenna 184 comprising a patch, omnidirectional, beam, monopole, dipole, or rhombic antenna, among others, to communicatively couple the mobile node 106 to the visited network 122.

The system 180 may also include a public data network (PDN) 188 coupled to the home network 114 to serve as a conduit for data traffic 136A, 136B, 136C, 136D tunneled from the home network 114 to the visited network 122. The system 180 may further include a correspondent node 192 coupled to the PDN 188 to communicate with the mobile node 106 following the registration mentioned above.

Any of the components previously described can be implemented in a number of ways, including embodiments in software. Thus, the apparatus 100; mobile node 106; base station 107; security domains 110, 126; home network 114; proxy mobile node 118; visited network 122; foreign agent 130; Internet protocol tunnel 134; traffic 136A, 136B, 136C, 136D, 136E, 136F; home agent 138; security server 142; authentication operation 143; authenticator 146; system 180; antenna 184; public data network (PDN) 188; and correspondent node 192 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

It should also be understood that the apparatus and systems of various embodiments can be used in applications other than securely and dynamically registering a mobile node roaming in a foreign security domain using a proxy agent. Thus, various embodiments of the invention are not to be so limited. The illustrations of apparatus 100 and system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, and others. Some embodiments may include a number of methods.

Figure 2A:
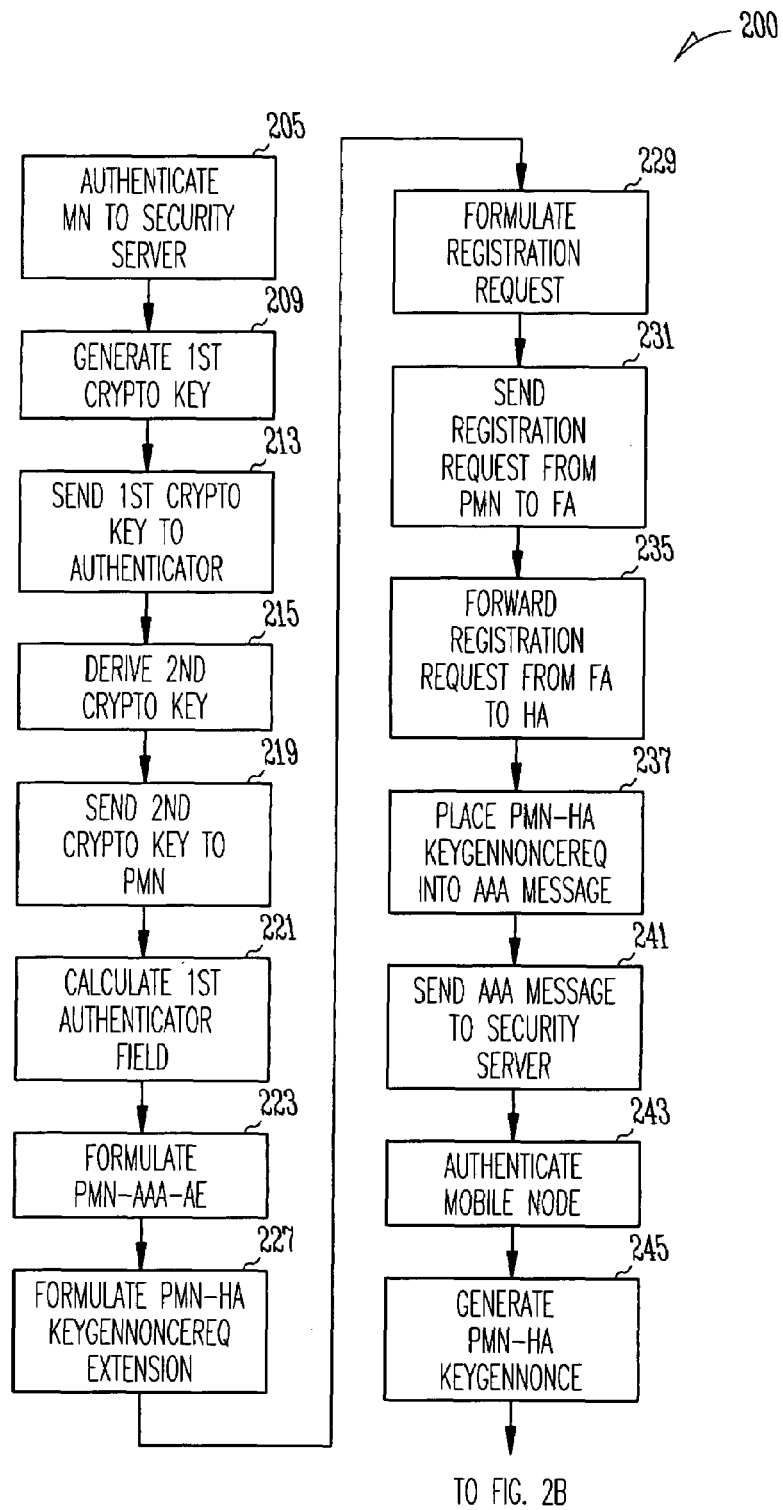
FIGS. 2A and 2B are a flow diagram illustrating several methods according to various embodiments of the invention.
Figure 2B:
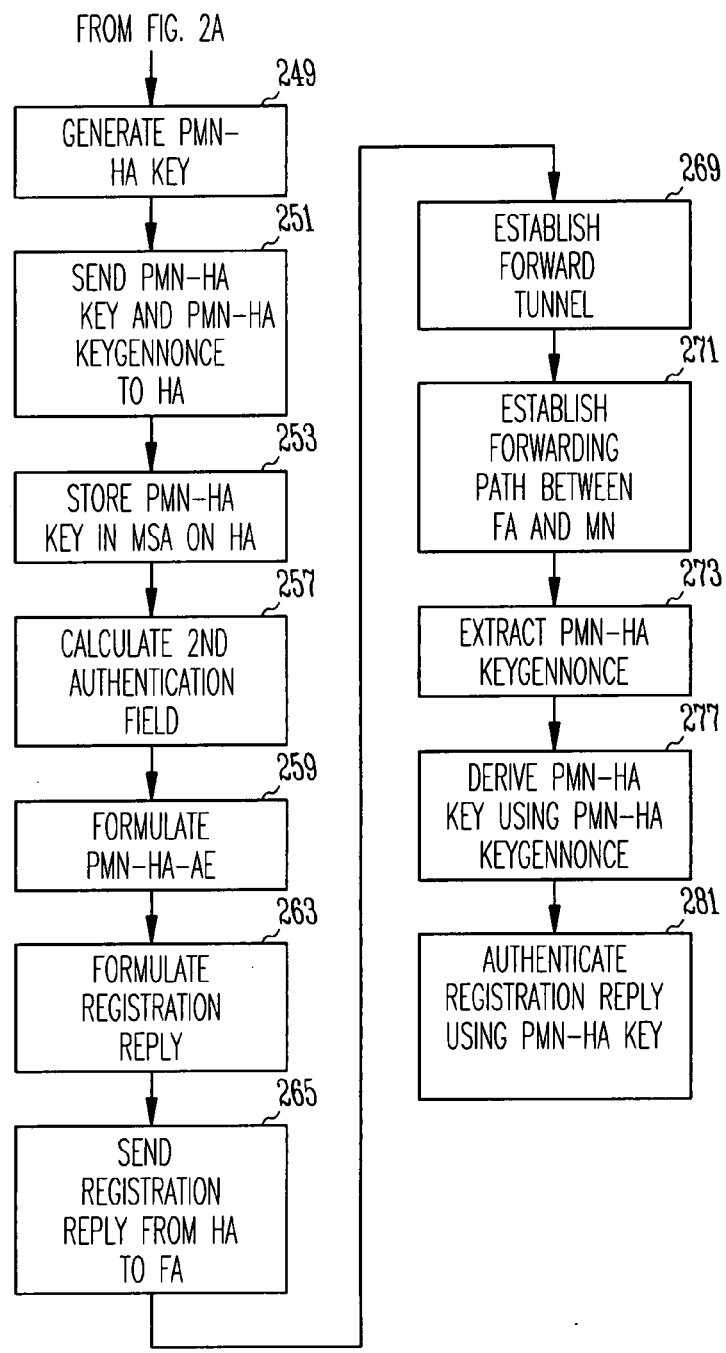

FIGS. 2A and 2B are flow diagram representations illustrating several methods according to various embodiments of the invention. The method 200 may include securely and dynamically registering a mobile node with a home network using a proxy mobile node. The proxy mobile node may perform the registration while the mobile node roams in a visited network. Registration may include receiving one or more cryptographic keys from a security server to be used by the mobile node to encrypt messages to be sent from the mobile node and to de-encrypt messages received at the mobile node. In the context of the method 200, "dynamic registration" may include performing an authenticated registration without having entered identification data for the mobile node into a security database on the visited access network prior to association of the mobile node with the visited access network.

The mobile node may "belong" to the home network in the sense that a prefix within a home address configured on the mobile node may correspond to a network address associated with the home network. And, security associations related to the mobile node may be stored in a security database on the home network. A first security domain associated with the home network may be separate from a second security domain associated with the visited network. The mobile node may comprise a mobile-Internet protocol (mobile-IP) node and the proxy mobile node may comprise a client node on the visited network. The client node may perform mobile-IP functions on behalf of the mobile node, as previously described.

The method 200 may commence at block 205 with authenticating the mobile node (MN) to a security server on the home network. The security server may comprise a mobile-IP authentication, authorization, and accounting (AAA) server. Authentication may occur via an EAP protocol, wherein EAP packets originating from the mobile node are allowed through the visited network prior to authentication. The method 200 may continue at block 209 with generating a first cryptographic key at the mobile node and at the security server. The first cryptographic key may comprise a master session key (MSK), among other types.

The method 200 may also include sending the first cryptographic key to an authenticator from the security server, at block 213, wherein the authenticator comprises a node on the visited access network. A second cryptographic key may then be derived from the first cryptographic key at the security server and at the authenticator, at block 215. The second cryptographic key may comprise a proxy mobile node authentication, authorization, and accounting (PMN-AAA) key. The method 200 may further include sending the second cryptographic key to the proxy mobile node, at block 219.

The method 200 may continue at the proxy mobile node with calculating a first authenticator field using the PMN-AAA key at block 221. A proxy mobile node authentication, authorization, and accounting authentication extension (PMN-AAA-AE) may be formulated using the first authenticator field, at block 223. A proxy mobile node to home agent (PMN-HA) key generation nonce request (KeyGen-NonceReq) extension may be formulated using the second cryptographic key, at block 227. The proxy mobile node may formulate a registration request containing the PMN-AAA authentication extension and the PMN-HA KeyGenNonceReq, at block 229. The proxy mobile node may then send the registration request to a foreign agent (FA) node on the visited access network, at block 231.

The method 200 may also include forwarding the registration request to a home agent via the foreign agent, wherein the home agent comprises a node on the home network, at block 235. The method 200 may continue at the home agent with placing the PMN-HA KeyGenNonceReq into an AAA message, at block 237. The AAA message may then be sent to the security server, at block 241.

The method 200 may continue at the security server with authenticating the mobile node, at block 243, and with generating the PMN-HA key generation nonce (KeyGen-Nonce), at block 245. The method 200 may also include generating a PMN-HA key using the PMN-HA KeyGen-Nonce, at block 249. Both the PMN-HA KeyGenNonce and the PMN-HA key may then be sent to the home agent, at block 251. It is noted that some of these activities may be performed according to procedures documented in IETF Request for Comments 3957 (March 2005).

The method 200 may continue further at the home agent with storing the PMN-HA key in a mobility security association (MSA) on the home agent, at block 253. The home agent may calculate a second authenticator field, at block 257, and may formulate a PMN-HA authentication extension (PMN-HA-AE) using the second authenticator field, at block 259. The home agent may also formulate a registration reply incorporating the PMN-HA-AE and the PMN-HA KeyGenNonce, at block 263. The PMN-HA KeyGenNonce may be embedded in a PMN-HA KeyGenNonce reply extension. The method 200 may continue with sending the registration reply from the home agent to the foreign agent, at block 265. The method 200 may thus include establishing a forwarding tunnel from the home agent to the foreign agent to forward traffic to the mobile node, at block 269. The method 200 may also include establishing a forwarding path between the foreign agent and the mobile node, at block 271.

The method 200 may continue at the proxy mobile node with extracting the PMN-HA KeyGenNonce from the registration reply, at block 273. The PMN-HA key may then be derived using the PMN-HA KeyGenNonce, at block 277. The method 200 may conclude at block 281 with authenticating the registration reply using the PMN-HA key.

It may be possible to execute the activities described herein in an order other than the order described. And, various activities described with respect to the methods identified herein can be executed in repetitive, serial, or parallel fashion. Information including parameters, commands, operands, and other data can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
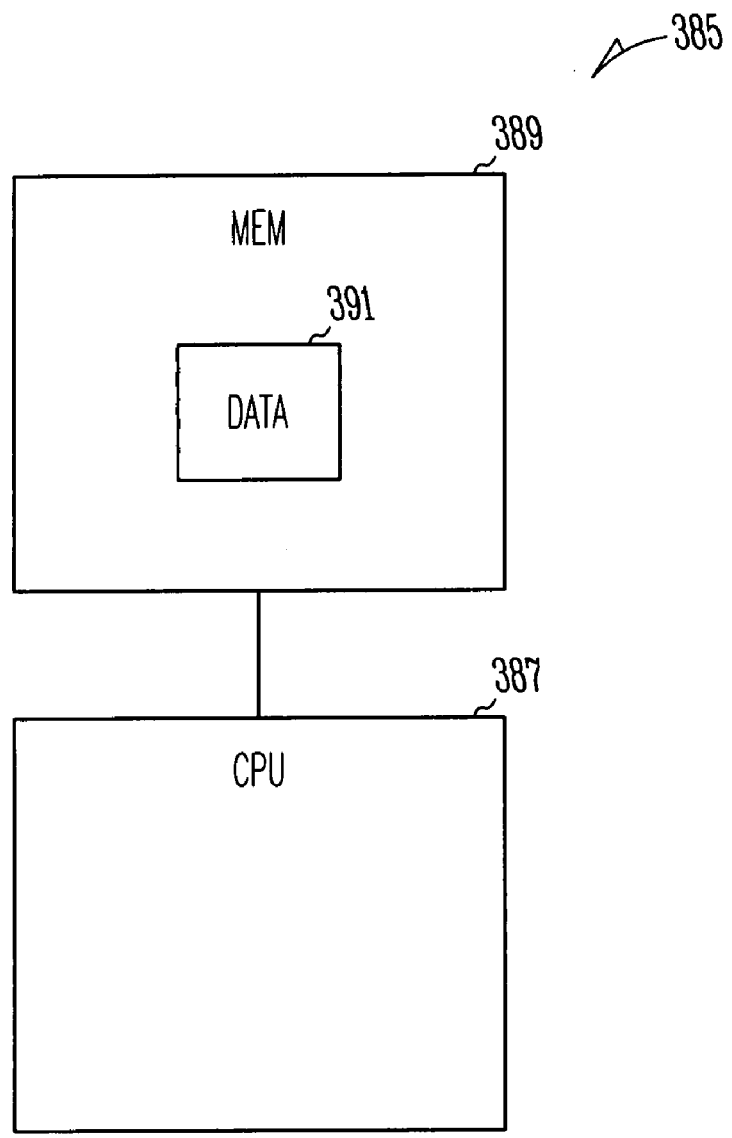
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) such as a CPU 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the CPU 387) securely and dynamically registering a mobile node with a home network using a proxy mobile node, as previously described.

Other activities may include authenticating the mobile node to a security server, wherein the security server comprises a node on the home network. Additional activities may include receiving at least one cryptographic key from the security server to be used by the mobile node to encrypt messages sent from the mobile node and to de-encrypt messages received at the mobile node.

Implementing the apparatus, systems, and methods disclosed herein may operate to securely and dynamically register a mobile node roaming in a foreign security domain using a proxy mobile node on a visited network within the foreign security domain.

Although the inventive concept may include embodiments described in the exemplary context of an 802.xx implementation (e.g., 802.11, 802.11a, 802.11g, 802.11n, 802.11 HT, 802.16, etc.), the claims are not so limited. Embodiments of the present invention may be implemented as part of any wired or wireless system Examples may also include embodiments comprising multi-carrier wireless communication channels (e.g., OFDM, DMT, etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, including:
    securely and dynamically registering a mobile node with a home network using a proxy mobile node to perform the registration while the mobile node roams in a visited network, wherein a first security domain associated with the home network is separate from a second security domain associated with the visited network;
    generating a first cryptographic key at the mobile node and at a security server;
    sending the first cryptographic key to an authenticator from the security server, wherein the authenticator comprises a node on the visited network; and
    deriving a second cryptographic key from the first cryptographic key at the security server and at the authenticator to authenticate the mobile node to the security server.

2. The method of claim 1, wherein the mobile node comprises a mobile-Internet protocol (mobile-IP) node and the proxy mobile node comprises a client node on the visited network, the proxy mobile node to perform mobile-IP functions on behalf of the mobile node.

3. The method of claim 1, wherein a prefix within a home address configured on the mobile node corresponds to a network address associated with the home network.

4. The method of claim 1, wherein the security server comprises a node on the home network.

5. The method of claim 1, wherein the security server comprises a mobile-IP authentication, authorization, and accounting (AAA) server.

6. The method of claim 1, wherein the first cryptographic key comprises a master session key (MSK).

7. The method of claim 1, wherein the second cryptographic key comprises a proxy mobile node authentication, authorization, and accounting (PMN-AAA) key.

8. The method of claim 1, further including:
    sending the second cryptographic key to the proxy mobile node.

9. The method of claim 1, further including performing the following sequence using the proxy mobile node:
    calculating a first authenticator field using the PMN-AAA key;
    formulating a proxy mobile node authentication, authorization, and accounting (PMN-AAA) authentication extension using the first authenticator field;
    formulating a proxy mobile node to home agent (PMN-HA) key generation nonce request extension using the second cryptographic key;
    formulating a registration request containing the PMN-AAA authentication extension and the PMN-HA key generation nonce request; and
    sending the registration request to a foreign agent, wherein the foreign agent comprises a node on the visited access network.

10. The method of claim 9, further including:
    forwarding the registration request to a home agent via the foreign agent, wherein the home agent comprises a node on the home network.

11. The method of claim 10, further including performing the following sequence using the home agent:
    placing the PMN-HA key generation nonce request into an AAA message; and
    sending the AAA message to the security server.

12. The method of claim 11, further including performing the following sequence at the security server:
    authenticating the mobile node;
    generating the PMN-HA key generation nonce;
    generating a PMN-HA key using the PMN-HA key generation nonce; and
    sending the PMN-HA key generation nonce and the PMN-HA key to the home agent.

13. The method of claim 12, performed according to procedures documented in Internet Engineering Task Force Request for Comments 3957 (March 2005).

14. The method of claim 12, further including performing the following sequence at the home agent:
    storing the PMN-HA key in a mobility security association on the home agent;
    calculating a second authenticator field;
    formulating a PMN-HA authentication extension using the second authenticator field;
    formulating a registration reply incorporating the PMN-HA authentication extension and the PMN-HA key generation nonce, the PMN-HA key generation nonce embedded in a PMN-HA key generation nonce reply extension;
    sending the registration reply to the foreign agent; and
    establishing a forwarding tunnel from the home agent to the foreign agent to forward traffic to the mobile node.

15. The method of claim 14, further including:
    establishing a forwarding path between the foreign agent and the mobile node.

16. The method of claim 14, further including performing the following using the proxy mobile node:
    extracting the PMN-HA key generation nonce from the registration reply;

deriving the PMN-HA key using the PMN-HA key generation nonce; and authenticating the registration reply using the PMN-HA key.

17. An article including a machine-accessible medium having associated information, wherein the information, when accessed, results in a machine performing:

securely and dynamically registering a mobile node with a home network using a proxy mobile node to perform the registration while the mobile node roams in a visited network, wherein a first security domain associated with the home network is separate from a second security domain associated with the visited network;

generating a first cryptographic key at the mobile node and at a security server;

sending the first cryptographic key to an authenticator from the security server, wherein the authenticator comprises a node on the visited network; and deriving a second cryptographic key from the first cryptographic key at the security server and at the authenticator to authenticate the mobile node to the security server.

18. The article of claim 17, wherein the security server comprises a node on the home network.

19. The article of claim 17, wherein the information, when accessed, results in a machine performing:

receiving at least one cryptographic key from the security server to be used by the mobile node to encrypt messages to be sent from the mobile node and to de-encrypt messages received at the mobile node.

* * * * *

UNITED STATES PATENT AND TRADEMARK OFFICE
CERTIFICATE OF CORRECTION

PATENT NO.        : 7,313,394 B2                                   Page 1 of 1
APPLICATION NO.   : 11/182498
DATED             : December 25, 2007
INVENTOR(S)       : Bakshi It is certified that error appears in the above-identified patent and that said Letters Patent is hereby corrected as shown below:

Title page, Item (56), under "Foreign Patent Documents", insert -- JP    2003-018195 01/17/2003 --.

Title page, Item (56), under "Other Publications", delete "Accouniting" and insert -- Accounting --, therefor.

Signed and Sealed this

Nineteenth Day of May, 2009

JOHN DOLL
*Acting Director of the United States Patent and Trademark Office*